Dec. 23, 1930.                    J. WARD                    1,786,100
                                SEED PLANTER
                              Filed May 6, 1929          3 Sheets-Sheet 3

INVENTOR:
BY  Joseph Ward
                    ATTORNEY.

Patented Dec. 23, 1930

1,786,100

UNITED STATES PATENT OFFICE

JOSEPH WARD, OF HUNTINGTON, WEST VIRGINIA, ASSIGNOR OF ONE-TENTH TO J. E. MILLER, OF HUNTINGTON, WEST VIRGINIA

SEED PLANTER

Application filed May 6, 1929. Serial No. 360,747.

The present invention relates to seed planters, and aims to provide a novel and improved wireless check row planter.

Another object of the invention is the provision of novel means for actuating the seed dropping means from one of the wheels of the planter at spaced intervals to aline with the hills of previously planted rows.

Another object is the provision of novel means for removing the shovels from the ground, such as when turning around at the ends of the rows or when traveling to and from the field.

A further object is the provision of a seed planter having provisions for depositing fertilizer with the seed.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
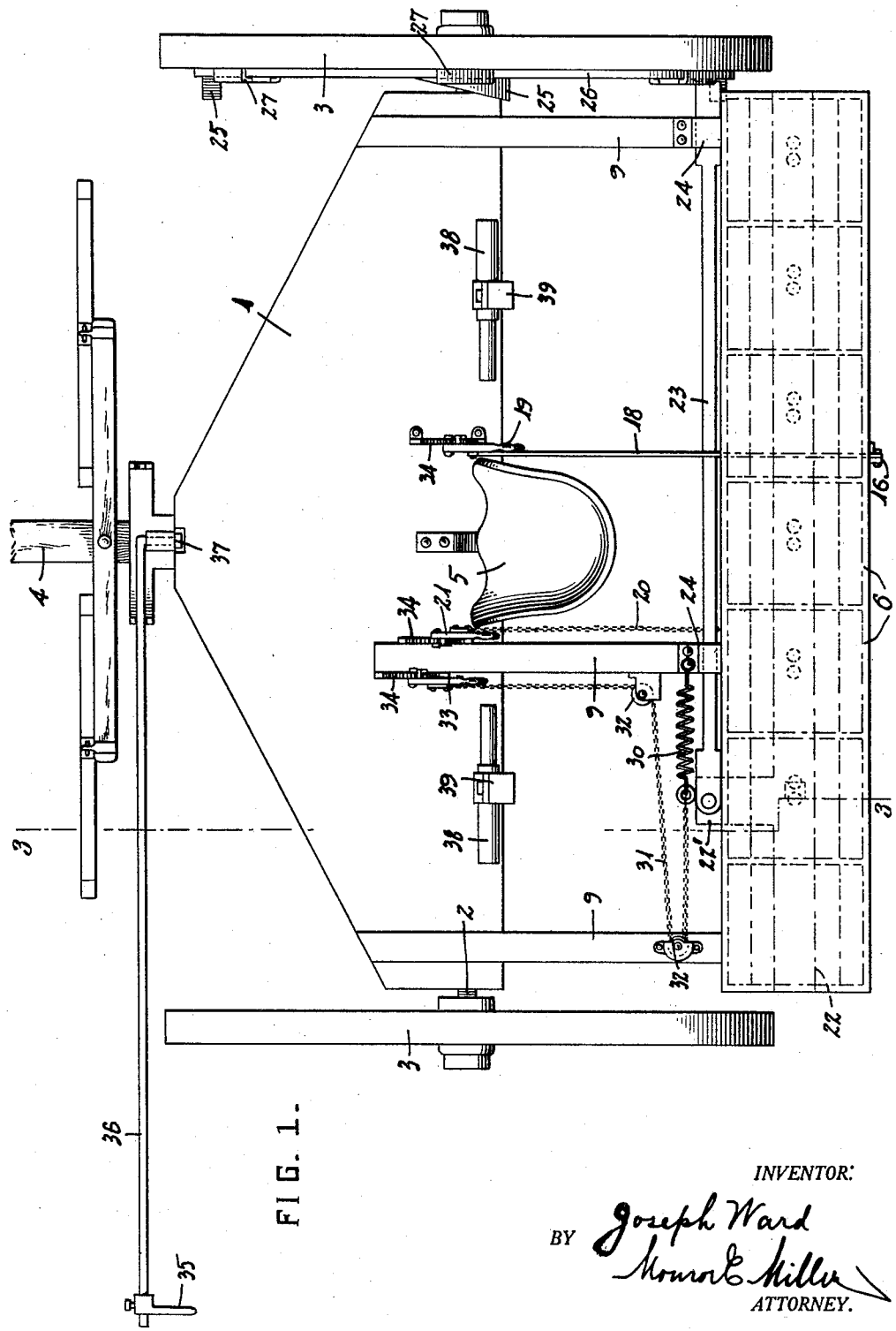
Figure 1 is a plan view of the improved seed planter.
Figure 2:
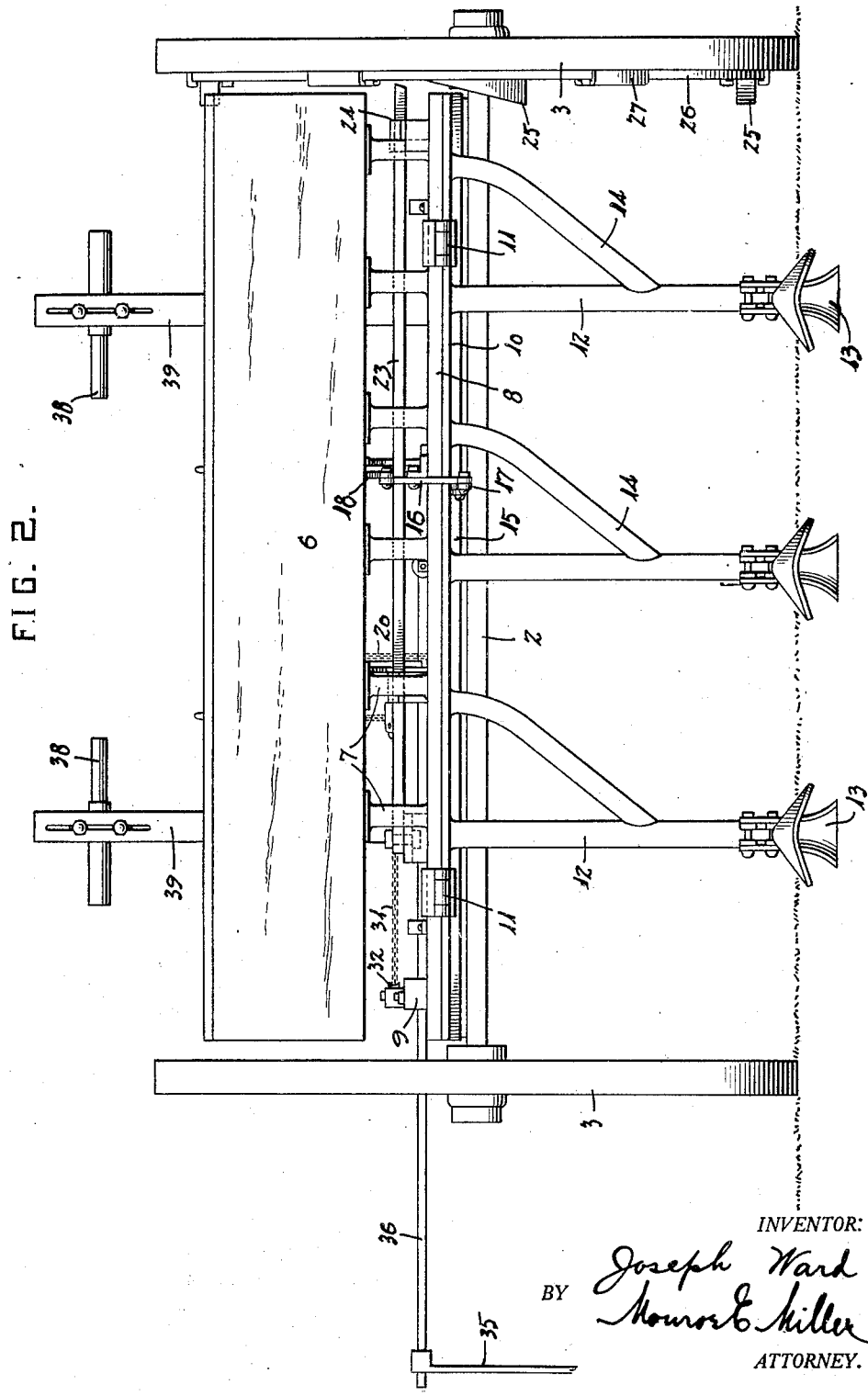
Fig. 2 is a rear view thereof.
Figure 3:
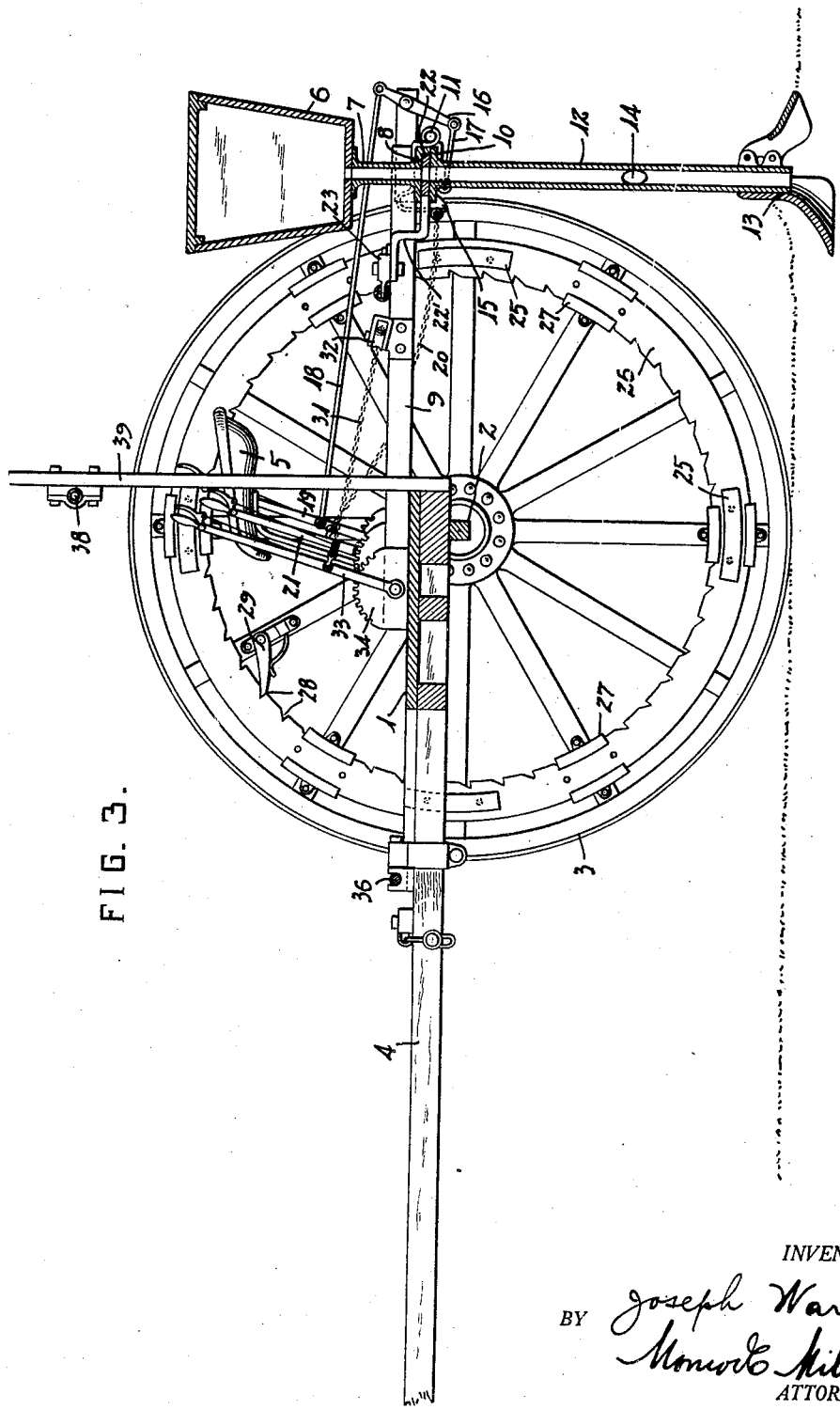
Fig. 3 is a section on the line 3—3 of Fig. 1.

As shown, the planter is mounted on a two-wheeled vehicle comprising the platform 1 mounted on an axle 2 on which the wheels 3 are rotatable, and a tongue 4 extends forwardly to which the draft animals are hitched. A seat 5 for the operator is mounted on the frame.

A transverse set or row of bins or hoppers 6 is provided in rear of the platform 1, for holding the seed and fertilizer, and said bins have downwardly extending discharge spouts 7 which are attached at their lower ends to a transverse bar 8 disposed below the bins and carried by rearwardly extending brackets 9 secured to the platform 1.

A bar 10 below the bar 8 is hingedly connected therewith, as at 11, and has depending discharge spouts or boots 12 provided with suitable shovels 13 at their lower ends.

The hinges 11 permit the spouts 12 to be swung rearwardly and upwardly for removing the shovels from the ground when turning the planter around at the ends of the rows or when traveling to and from the field.

The spouts 12 are for alternate bins 6 in which the seed is held, and inclined spouts or tubes 14 are connected at their upper ends with the bar 10 and at their lower ends with the spouts 12 for conveying fertilizer from the other bins into the seed spouts 12.

A valve bar 22 is slidable in the bar 8, which has a channel to accommodate said bar 22, and said valve bar has apertures to register alternately with the spouts 7 and the spouts 12, 14, the spouts 7 being offset with reference to the spouts 12, 14 so that the valve bar 22 being reciprocated will receive seed and fertilizer from the spouts 7 and will drop same down the spouts 12, 14. The fertilizer is dropped into the spouts 12 to be deposited in the ground with the seeds.

A catch 15 is carried by the bar 8 to engage under the bar 10 for holding the bar 10 and spouts 12, 14 thereof in operative position.

When the bar 10 is released it may be swung to move the spouts 12, 14 rearwardly and upwardly. For this purpose, a lever 16 is pivotally supported from the bar 8 and is connected by link 17 with the bar 10 and by a link or rod 18 with a hand lever 19 fulcrumed on the platform 1 at the right side of the seat 5. A chain or flexible element 20 connects the catch 15 with a hand lever 21 fulcrumed on the platform at the left side of the seat 5.

By swinging the lever 21 the operator may move the catch 15 to releasing position, and the lever 19 may then be swung to swing the spouts 12, 14 rearwardly and upwardly off the ground and to swing them back to operative position, the catch 15 being preferably spring-pressed so as to snap into engagement with the bar 10.

The valve bar 22 has a forwardly extending arm 22' pivoted to a reciprocatory rod 23 slidable in the guides 24 secured on two of the brackets 9. One end of the rod 24 is engaged by cams 25 carried by a ring 26 mounted on one of the wheels 3.

The ring 26 is slidably mounted in guides 27 secured to spokes of the wheel 3, and said ring has notches 28 engaged by a pawl or dog 29 mounted on one spoke of the wheel, and permitting the ring 26 to be moved forwardly but not rearwardly with reference to the direction of rotation of the wheel 3.

As shown, there are four cams 25 on the ring 26, which may be detachably secured thereto by screws or other securing elements, and said ring is provided with apertures for the use of two, three, four, five or more cams, according to the spacing of the hills that may be desired.

The rod 23 and valve bar 22 are moved in one direction by the cams 25, and said rod and valve bar are moved in the opposite direction by a suitable spring 30.

In order to stop the dropping of seed and fertilizer, a chain or flexible element 31 is connected to the arm 22' and passes around guide pulleys 32 on the brackets 9, and is connected to a hand lever 33 mounted on the platform 1, so that said hand lever may be swung to pull the chain 31 and move the valve bar 22 against the influence of the spring 30, thereby withdrawing the rod 23 from the path of the cams 25.

Segments 34 are provided on the platform 1 for holding the levers 19, 21 and 33 in different positions.

It is preferable to provide a marker 35 for marking a line in the ground at either end of the planter to assist in guiding the planter when planting the succeeding rows of seed. As shown, the marker 35 is mounted on a rod 36 hingedly mounted on the tongue 4, as at 37, so that said rod may be swung to either side.

Telescopes or sights 38 are mounted at opposite sides of the seat 5 on standards 39, and enable the operator to set the ring 26 when starting the planting at one end of the field. The planter is moved to position so that stakes or other markers are seen through the sights 38, and the ring 26 may then be advanced so that the cams 29 will properly operate the valve bar 22 so as to drop the seeds in alinement with the hills of previously planted rows.

When the ring 26 has been set before starting across the field, the valve bar 22 is operated at proper intervals so that the seed is deposited in the ground in line with the hills of the previously planted rows. However, if the transverse alinement is disturbed, the operator may advance the ring 26 so as to properly adjust the cams 25, and thereby correct the dropping of the seed in the rows which are being planted, to register with the previously planted rows.

Having thus described the invention, what is claimed as new is:

1. A seed planter comprising seed and fertilizer bins arranged in a single transverse row, discharge spouts therefor, and a single valve member for delivering seed and fertilizer from said bins into said spouts, the fertilizer spouts being connected to the seed spouts.

2. A seed planter comprising seed and fertilizer bins arranged in a single transverse row, a bar below said bins, discharge spouts for seed and fertilizer depending from said bar, the fertilizer spouts being connected to the seed spouts, and a single valve member between said bins and bar for dropping seed and fertilizer from the bins into said spouts.

3. A seed planter comprising bins having discharge portions, a bar hinged under said portions, discharge spouts depending from said bar, means for swinging said bar and spouts, and a valve bar above said bar controlling the discharge from said discharge portions into said spouts, the first named bar being arranged to swing to and from the valve bar.

4. A seed planter comprising bins having discharge portions, a bar connected to said portions, a second bar hingedly connected with said bar, spouts depending from the second bar, a valve bar slidable in the first-named bar to control the flow from said discharge portions into the spouts, and means connected to the second bar for swinging it and the spouts.

5. A seed planter comprising bins having discharge portions, a bar connected to said portions, a second bar hingedly connected with said bar, spouts depending from the second bar, a valve bar slidable in the first-named bar to control the flow from said discharge portions into the spouts, means connected to the second bar for swinging it in the spouts, and a catch for holding the second bar when swung against the first-named bar.

In testimony whereof I hereunto affix my signature.

JOSEPH WARD.